United States Patent
Nordback (10) Patent No.: US 9,483,443 B2
(45) Date of Patent: Nov. 1, 2016

(54) TILED DISPLAY LIST

(71) Applicant: Kurt N. Nordback, Boulder, CO (US)

(72) Inventor: Kurt N. Nordback, Boulder, CO (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 724 days.

(21) Appl. No.: 13/621,695

(22) Filed: Sep. 17, 2012

(65) Prior Publication Data
US 2014/0082474 A1 Mar. 20, 2014

(51) Int. Cl.
*G06F 3/00* (2006.01)
*G06F 17/21* (2006.01)

(52) U.S. Cl.
CPC .................... *G06F 17/211* (2013.01)

(58) Field of Classification Search
CPC ............. G06F 17/224; G06F 17/211; G06F 17/30905; G06F 17/2229; G06F 17/3089
See application file for complete search history.

(56) References Cited

U.S. PATENT DOCUMENTS

| | | | |
|---|---|---|---|
| 6,466,229 B1* | 10/2002 | Nagao | G06T 1/60 345/621 |
| 8,533,628 B2* | 9/2013 | Rohrabaugh et al. | 715/815 |
| 2002/0097408 A1* | 7/2002 | Chang et al. | 358/1.6 |
| 2006/0095910 A1* | 5/2006 | Norton et al. | 718/100 |
| 2006/0279566 A1* | 12/2006 | Atkins et al. | 345/418 |
| 2010/0225984 A1* | 9/2010 | Niina et al. | 358/538 |
| 2010/0268694 A1* | 10/2010 | Denoue et al. | 707/693 |
| 2013/0141465 A1* | 6/2013 | Shivrastava et al. | 345/660 |

* cited by examiner

*Primary Examiner* — Kyle Stork
(74) *Attorney, Agent, or Firm* — Osha Liang LLP (57) ABSTRACT

A method for scaling including: obtaining an electronic document (ED) identifying a graphical feature; partitioning the ED into multiple tiles including a first tile and a second tile, where the graphical feature spans the first tile and the second tile; partitioning the graphical feature into a first fragment located solely within the first tile and a second fragment located solely within the second tile; adding the first fragment to a first display sub-list corresponding to the first tile; adding the second fragment to a second display sub-list corresponding to the second tile; receiving a first request to scale the ED specifying a resolution and a first region intersecting a subset of the plurality of tiles including the first tile but excluding the second tile; and generating, in response to the first request, a first scaled ED for the display device by rendering only the first display sub-list the resolution.

20 Claims, 5 Drawing Sheets

TILED DISPLAY LIST

BACKGROUND

Computing devices are frequently used to display electronic documents (EDs). Moreover, computing devices often receive requests from users to zoom in to or zoom out from (i.e., scale) a displayed ED. However, scaling the ED is a non-trivial operation that consumes computing resources. In fact, scaling operations on computing devices utilizing low-powered hardware (e.g., mobile computing devices) have slow execution times that are observable by the users and interfere with the users' viewing experience. Regardless, users still wish to scale EDs on all types of computing devices.

SUMMARY

In general, in one aspect, the invention relates to a method for scaling on a display device. The method comprises: obtaining an electronic document (ED) identifying a first graphical feature and a second graphical feature; partitioning the ED into a plurality of tiles comprising a first tile and a second tile, wherein the first graphical feature spans the first tile and the second tile, and wherein the second graphical feature is located solely within the second tile; partitioning the first graphical feature into a first fragment located solely within the first tile and a second fragment located solely within the second tile; adding the first fragment to a first display sub-list corresponding to the first tile; adding the second fragment and the second graphical feature to a second display sub-list corresponding to the second tile; receiving a first request to scale the ED, wherein the first request specifies a resolution and a first region intersecting a subset of the plurality of tiles including the first tile but excluding the second tile; and generating, in response to the first request, a first scaled ED for the display device by rendering the first display sub-list at the resolution without rendering the second display sub-list.

In general, in one aspect, the invention relates to a non-transitory computer readable medium (CRM) storing instructions for scaling. The instructions comprising functionality for: obtaining an electronic document (ED) identifying a first graphical feature and a second graphical feature; partitioning the ED into a plurality of tiles comprising a first tile and a second tile, wherein the first graphical feature spans the first tile and the second tile, and wherein the second graphical feature is located solely within the second tile; partitioning the first graphical feature into a first fragment located solely within the first tile and a second fragment located solely within the second tile; adding the first fragment to a first display sub-list corresponding to the first tile; adding the second fragment and the second graphical feature to a second display sub-list corresponding to the second tile; receiving a first request to scale the ED, wherein the first request specifies a resolution and a first region intersecting a subset of the tiles including the first tile but excluding the second tile; and generating, in response to the first request, a first scaled ED for the display device by rendering the first display sub-list at the resolution without rendering the second display sub-list.

In general, in one aspect, the invention relates to a system for scaling on a display device. The system comprises: a processor; a buffer storing an electronic document (ED) identifying a first graphical feature and a second graphical feature; a processing engine executing on the processor and configured to: partition the ED into a plurality of tiles comprising a first tile and a second tile; and partition the first graphical feature into a first fragment located solely within the first tile and a second fragment located solely within the second tile; a first sub-display list corresponding to the first tile and comprising the first fragment; a second sub-display list corresponding to the second tile and comprising the second fragment and the second graphical feature; and a rendering engine configured to: generate, in response to receiving a first scaling request, a first scaled ED for the display device by rendering the first display sub-list without rendering the second display sub-list, wherein the first scaling request specifies a resolution and a region intersecting a subset of the plurality of tiles including the first tile and excluding the second tile.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for scaling an ED on a display device. The ED includes one or more graphical features (e.g., text characters, graphics, images, etc.). Prior to receiving a request to scale the ED on the display device, each page of the ED is partitioned into multiple tiles having the same or different areas. A graphical feature located solely within a tile is added to a display sub-list corresponding to the tile (i.e., there exists one display sub-list for each tile). A graphical feature spanning across multiple tiles is partitioned into fragments, with each fragment being located solely within a single tile. Each fragment is added to the display sub-list for the tile where the fragment is located. The request to scale the ED on the display device specifies a resolution (i.e., a scale factor) and a region to scale. The region intersects a subset of the tiles, and only the display sub-lists corresponding to the subset of tiles are rasterized based on the resolution (i.e., rendered at the resolution).

Figure 1:
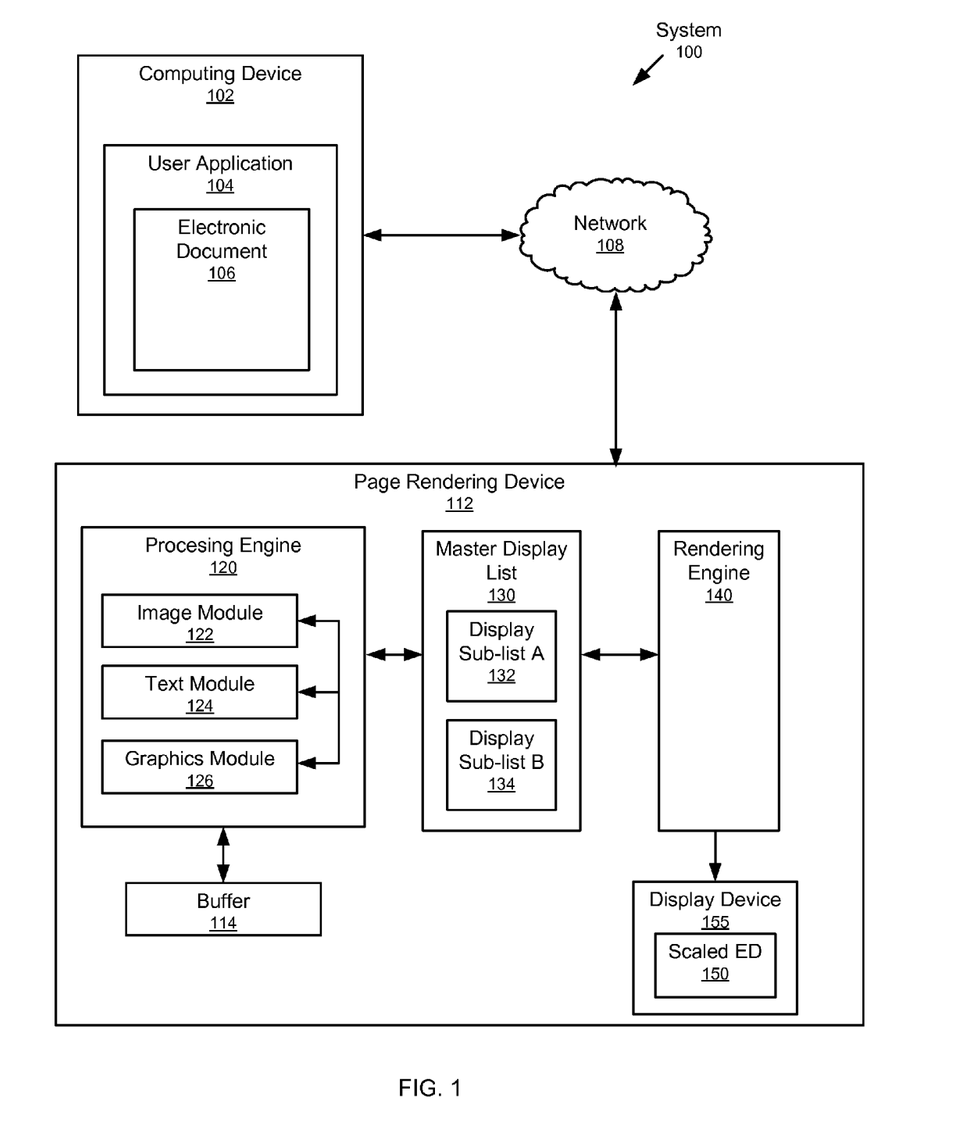
FIG. 1 shows a system in accordance with one or more embodiments of the invention.

FIG. 1 shows a system (100) in accordance with one or more embodiments of the invention. As shown in FIG. 1, the system (100) has multiple components including a page rendering device (PRD) (112) and a computing device (102). The PRD (112) and/or the computing device (102) may be a personal computer (PC), a desktop computer, a mainframe, a server, a telephone, a kiosk, a cable box, a personal digital assistant (PDA), an electronic reader, a mobile phone, a smart phone, a tablet computer, etc. The PRD (112) and/or the computing device (102) may include a display device (e.g., a monitor, screen, etc.) for displaying an ED (discussed below). In one or more embodiments of the invention, there exists a direct connection (e.g., universal serial bus (USB) connection) between the computing device (102) and the PRD (112). Alternatively, the computing device (102) and the PRD (112) may be connected using a network (108) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)). Accordingly, the user application (104) may be a word-processing application, a spreadsheet application, a desktop publishing application, a graphics application, a photograph printing application, an Internet browser, a slide show generating application, a form, etc. The user application (104) may generate new EDs and/or obtain previously saved EDs.

In one or more embodiments of the invention, the ED (106) includes one or more graphical features (e.g., text characters, images, graphics, etc.) to be displayed on or across one or more pages. In one or more embodiments of the invention, the ED (106) is represented/defined using a page description language (e.g., Postscript, PDF, XPS, etc.) or a document markup language (e.g., open document format (ODF), office open XML (OOXML), etc.). Accordingly, the text characters, images, graphics, fonts, etc. in the ED (106) may be recorded/identified as page description language commands or attributes within the tags of the document markup language. Moreover, these graphical features (e.g., text characters, images, and graphics) are needed to correctly render the ED (106) for display or printing.

In one or more embodiments of the invention, the PRD (112) includes a buffer (114), a processing engine (120), a rendering engine (140), and a display device (155). As shown in FIG. 1, the processing engine (120) and the rendering engine (140) communicate using a master display list (130). Each of these components (114, 120, 130, 140) is discussed below.

In one or more embodiments of the invention, the PRD (112) includes the buffer (114). The buffer (114) may correspond to any type of memory or long-term storage (e.g., hard drive). The buffer (114) is configured to store the ED (106) obtained by the PRD (112).

In one or more embodiments of the invention, the processing engine (120) is configured to partition the each page of the ED (106) into multiple non-overlapping tiles. The tiles may all have the same area. Alternatively, two or more tiles may have different areas. The tiles may be any size and any shape including rectangles, triangles, hexagons, etc. Although the ED (106) may be viewable/observable by the user, the tiles and/or tile boundaries might not be viewable/observable by the user.

As discussed above, the ED (106) may have multiple graphical features (e.g., images, graphics, text characters, etc.). Following the tiling of the ED (160) (i.e., the partitioning of the ED (106) into multiple tiles), some graphical features may reside solely with a single tile, while other graphical features may span across multiple tiles. In one or more embodiments of the invention, the processing engine (120) is configured to partition a graphical feature that spans multiple tiles into multiple fragments. Specifically, each fragment is located solely within a single tile. For example, if the graphical feature spans two tiles, then the graphical feature is partitioned into two fragments, one for each of the two tiles.

In one or more embodiments of the invention, the master display list (130) includes multiple display sub-lists (e.g., Display Sub-list A (132), Display Sub-list B (134)). Each display sub-list (132, 134) corresponds to a single tile. In other words, there exists one display sub-list for each of the multiple tiles. The processing engine (120) is configured to add each fragment or whole graphical feature to the display sub-list corresponding to the tile containing the fragment or whole graphical feature. The fragment or graphical feature may correspond to one or more entries in the appropriate display sub-list (132, 134).

Although FIG. 1 shows display sub-list A (132) and display sub-list B (134) as being different sections within the master display list (130), those skilled in the art, having the benefit of this detailed description, will appreciate that each display sub-list (132, 134) may be its own display list (i.e., not part of the master display list (130)).

In one or more embodiments of the invention, the display sub-lists (132, 134) are resolution dependent. In one or more embodiments of the invention, the display sub-lists (132, 134) are resolution independent. Specifically, before a graphical feature or fragment is added to a display sub-list, the processing engine (120) is configured to perform any processing necessary on the graphical feature/fragment to display the graphical feature/fragment on the display device (155), except for any processing that is dependent on the resolution to be specified in a future scaling request. In such embodiments of the invention, the display sub-lists (132, 134) include these resolution independent (RI) versions of the graphical features and/or fragments. Moreover, the display sub-lists (132, 134) are generated before a request to scale the ED (106) is received.

In one or more embodiments of the invention, the processing engine (120) includes the image module (122). The image module (122) may be configured to generate RI versions of images (or fragments of images) by properly geometrically transforming the images for the device space and/or converting the images to the color-space (e.g., red-blue-green (RGB) space, etc.) of the display device (155). The RI versions of the images (or fragments of the images) may then be added to the appropriate display sub-list(s) (132, 134).

In one or more embodiments of the invention, the processing engine (120) includes the text module (124). The text module (124) may be configured to generate RI versions of text characters (or fragments of text characters) by extracting one or more character data values from fonts specified in the ED (106) and by generating vector outlines for the text characters. The RI versions of text characters (or fragments of text characters) may then be added to the appropriate display sub-list(s) (132, 134).

In one or more embodiments of the invention, the processing engine (120) includes the graphics module (126). The graphics module (126) may be configured to generate RI versions of graphics (e.g., clipart) (or fragments of graphics) by generating elemental vector objects, such as triangles or trapezoids, from the graphics which can quickly be scaled and discretized at a future time (i.e., in response to a scaling request) in device space. The RI versions of the graphics to may then be added to the appropriate display sub-list(s) (132, 134).

In one or more embodiments of the invention, a user's request to scale the ED (i.e., scaling request) specifies a resolution and a region of the ED to be scaled according to the resolution. Those skilled in the art, having the benefit of this detailed description, will appreciate that the region specified in the scaling request intersects with only a subset (i.e., not all) of the tiles.

In one or more embodiments of the invention, the rendering engine (140) is configured to generate a scaled ED (150) from one or more of the display sub-lists (132, 134). Specifically, the rendering engine (140) rasterizes/renders only display sub-lists corresponding to the subset of tiles. In other words, display sub-lists corresponding to tiles that do not intersect with the region, and thus are excluded from the subset of tiles, are not rasterized/rendered. In one or more embodiments of the invention, rasterizing/rendering a display sub-list includes traversing the display sub-list and scaling any graphical feature or fragment in the display sub-list according to the resolution specified in the scaling request.

The resulting scaled ED (150) is displayed on the display device (155). Any number of scaling requests may be received, and for each scaling request, the rendering engine (140) generates the scaled ED (150) by only rasterizing/rendering the display sub-lists (132, 134) that correspond to tiles that intersect with the region specified in the scaling request. In one or more embodiments of the invention, the display device (155) is external to the PRD (112).

Figure 2:
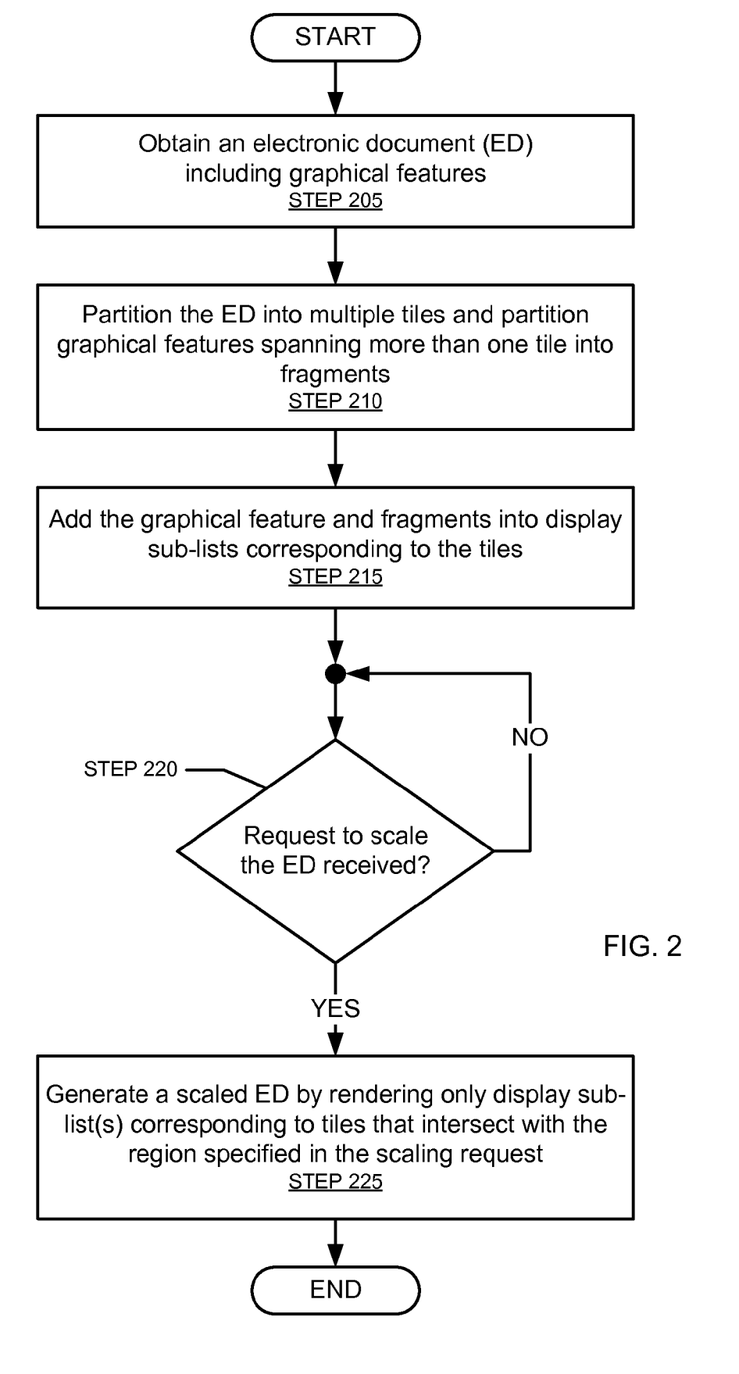
FIG. 2 shows a flowchart in accordance with one or more embodiments of the invention.

FIG. 2 shows a flowchart in accordance with one or more embodiments of the invention. The process shown in FIG. 2 may be executed, for example, by one or more components (e.g., processing engine (120), master display list (130), rendering engine (140)) discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, an ED including one or more graphical features is obtained (STEP 205). The graphical features may include text characters, graphics (e.g., clipart), and/or images. As discussed above, the ED may be represented/defined using a page description language or a document markup language (e.g., open document format (ODF), office open XML (OOXML), etc.). Accordingly, the text characters, images, and/or graphics in the ED may be recorded/identified as attributes within the tags of the document markup language.

In STEP 210, the ED is partition into multiple non-overlapping tiles. The tiles may all be the same size. Alternatively, two or more tiles may be different sizes. Further, the tiles may be any shape. However, it is preferable to set the shape of the tiles so that the ED can be partitioned into plural parts in both of horizontal and vertical directions (i.e., partitioning the ED in a lattice fashion). Although the ED may be viewable/observable by the user, the tiles and/or tile boundaries might not be visible to the user.

Following the tiling, some of the graphical features may be located solely within a single tile, while other graphical features may span across two or more tiles. In STEP 210, a graphical feature spanning multiple tiles is partitioned into multiple fragments, with each fragment being located solely within a single tile.

In STEP 215, the graphical features and fragments are added to display sub-lists. Specifically, each display sub-list corresponds to a single tile. In other words, there exists one display sub-list for each of the multiple tiles. Each fragment or whole graphical feature is added to the display sub-list corresponding to the tile containing the fragment or whole graphical feature. The fragment or graphical feature may correspond to one or more entries in the appropriate display sub-list.

In one or more embodiments of the invention, the display sub-lists are resolution dependent. In one or more embodiments of the invention, the display sub-lists are resolution independent. Specifically, before a graphical feature or fragment is added to a display sub-list, any processing necessary to display the fragment or graphical feature on the display device is performed, except for any processing that is dependent on the resolution to be specified in a future scaling request. In such embodiments of the invention, the display sub-lists include these RI versions of the graphical features and/or fragments. For example, images (or fragments of images) are not scaled to the final display device resolution, but they are otherwise properly geometrically transformed for the device space, and are color-converted to the device color space, etc. As another example, graphics (or fragments of graphics) are processed to generate elemental objects, such as triangles or trapezoids, which can be quickly scaled and discretized in device space. As yet another example, character data values are extracted from one or more fonts in the ED, and outlines for text characters (or fragments of text characters) in the ED are generated.

In STEP 220, it is determined whether a request to scale the ED has been received (e.g., from a user). When it is determined that a request to scale the ED has been received, the process proceeds to STEP 225. When it is determined that a request to scale the ED has not arrived, the process continued to poll. In one or more embodiments of the invention, the request to scale the ED is received after the ED is already displayed to the user. In one or more embodiments of the invention, the request to scale the ED is received before the ED is displayed to the user. As discussed above, the scaling request specifies a resolution and a region of the ED to be scaled. The region intersects with a subset of the tiles. In other words, the subset of tiles includes some tiles and excludes other tiles.

In STEP 225, a scaled ED is generated by rasterizing/rendering only display sub-lists corresponding to tiles intersecting the region specified in the scaling request. The display sub-lists corresponding to tiles that do not intersect with the region (i.e., tiles excluded from the subset) are not rasterized/rendered. In one or more embodiments of the invention, rasterizing/rendering a display sub-list includes traversing the display sub-list and scaling any graphical feature or fragment in the display sub-list according to the resolution specified in the scaling request.

Those skilled in the art, having the benefit of this detailed description, will appreciate that any number of scaling requests may be received after STEP 215 is executed and thus STEP 225 may be executed any number of times. However, in each case, the display sub-lists already exist and thus the scaled ED is generated by rasterizing/rendering only the display sub-lists corresponding to tiles intersecting the region specified in the scaling request.

Figure 3A:
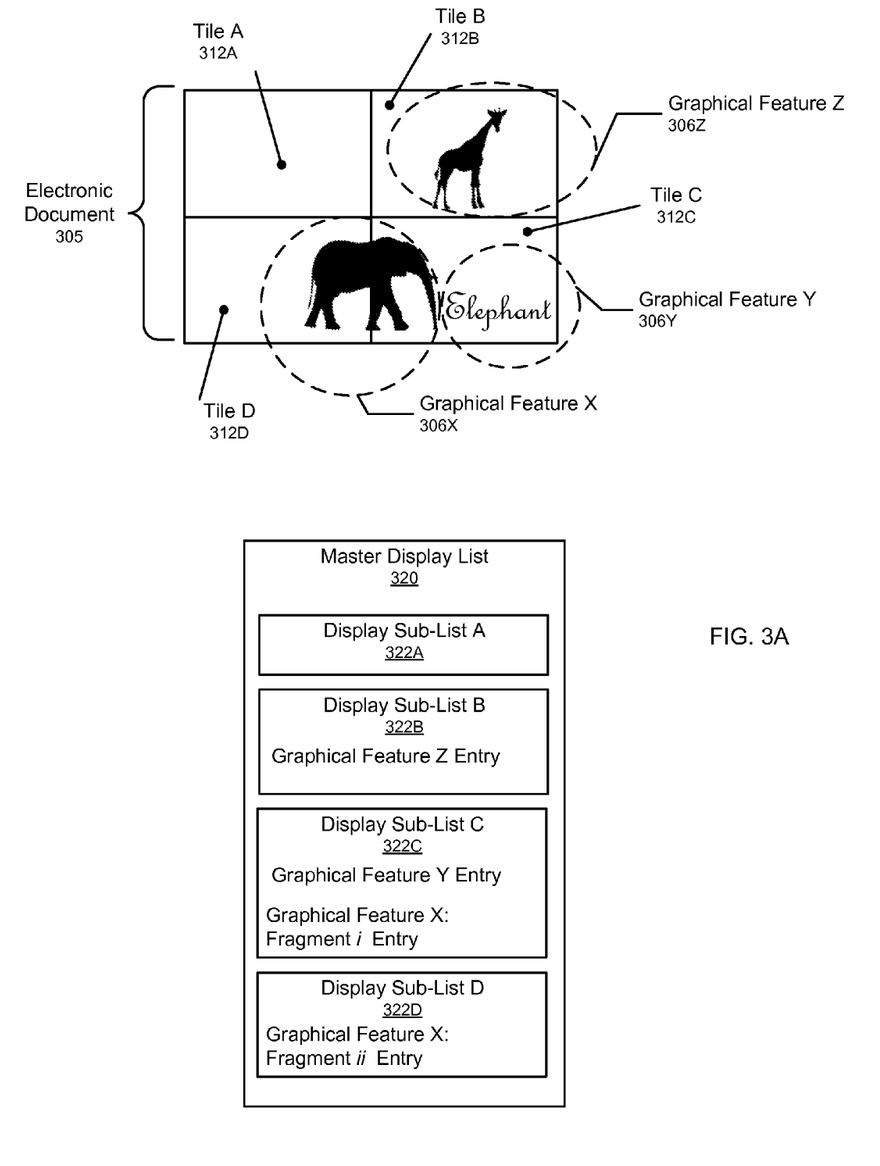
FIG. 3A and FIG. 3B show an example in accordance with one or more embodiments of the invention.
Figure 3B:
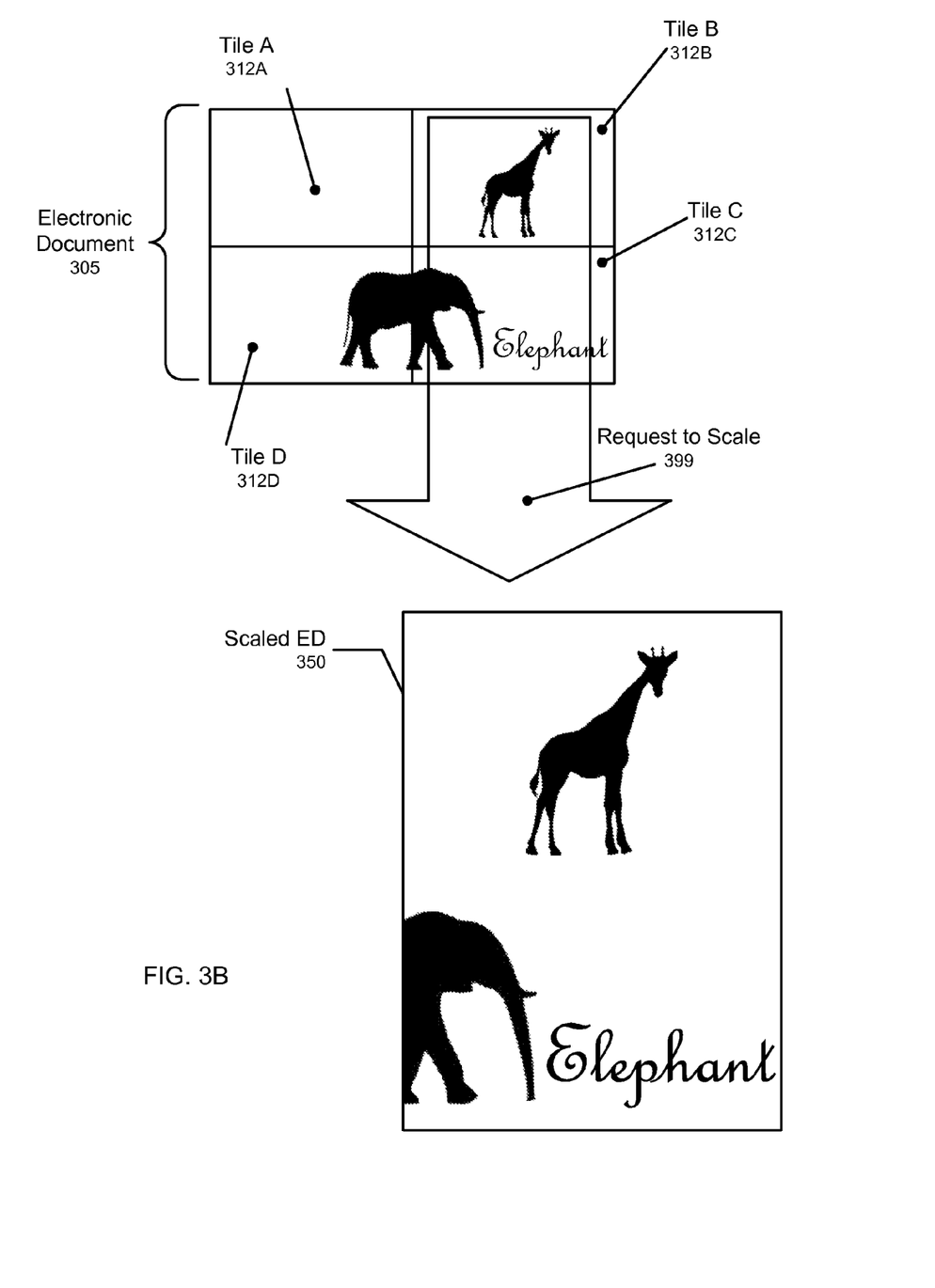

FIG. 3A and FIG. 3B show an example in accordance with one or more embodiments of the invention. As shown in FIG. 3A, there exists an ED (305). The ED (305) has three graphical features: Graphical Feature X (306X), Graphical Feature Y (306Y), and Graphical Feature Z (306Z). Graphical Feature X (306X) and Graphical Feature Z (306Z) correspond to graphics (e.g., clipart). Graphical Feature Y (306Y) corresponds to text characters.

As also shown in FIG. 3A, the ED (305) is partitioned into multiple tiles: Tile A (312A), Tile B (312B), Tile C (312C), and Tile D (312D). Graphical Feature Z (306Z) is located solely within Tile B (312B). Similarly, Graphical Feature Y (306Y) is located solely within Tile C (312C). However, Graphical Feature X (306X) spans across two tiles: Tile D (312D) and Tile C (312C).

Still referring to FIG. 3A, the Master Display List (320) is generated from the ED (305) and the tiles (312A, 312B, 312C, 312D). Moreover, the Master Display List (320) includes a display sub-list (i.e., Display Sub-List A (322A), Display Sub-List B (322B), Display Sub-List C (322C), Display Sub-List D (322D)) for each of the tiles (312A, 312B, 312C, 312D). Specifically, Display Sub-List A (322A) corresponds to Tile A (312A), Display Sub-List B (322B) corresponds to Tile B (312B), Display Sub-List C (322C) corresponds to Tile C (312C), and Display Sub-List D (322D) corresponds to Tile D (312D).

As discussed above, Graphical Feature Z (306Z) is located solely within Tile B (312B). Accordingly, Display Sub-List B (322B) includes an entry for Graphical Entry Z (306Z). Further, Graphical Feature Y (306Y) is located solely within Tile C (312C). Accordingly, Display Sub-List C (322C) includes an entry for Graphical Feature Y (306Y). However, Graphical Feature X (306X) spans two tiles (312D, 312C) and thus is partitioned into two fragments: fragment i in Tile C (312C) and fragment ii in Tile D (312D). Accordingly, Display Sub-List C (322C) also includes an entry corresponding to fragment i, while Display Sub-List D (322D) includes an entry corresponding to fragment ii.

Each graphical feature or fragment listed in the in the display sub-lists (322A, 322B, 322C, 322D) has undergone any processing necessary to display the fragment or graphical feature on the display device, except for any processing that is dependent on the resolution to be specified in a future scaling request. Accordingly, the display sub-lists (322A, 322B, 322C, 322D) include these RI versions of the graphical features and/or fragments. For example, images (or fragments of images) are not scaled to the final display device resolution, but they are otherwise properly geometrically transformed for the device space, and are color-converted to the device color space, etc. As another example, graphics (or fragments of graphics) are processed to generate elemental vector objects, such as triangles or trapezoids, which can be quickly scaled and discretized in device space. As yet another example, character data values are extracted from one or more fonts in the ED, and vector outlines for text characters (or fragments of text characters) in the ED are generated.

In FIG. 3B, a scaling request (399) is received. The scaling request (399) is received after the master display list (320) is created/generated. As shown in FIG. 3B, the scaling request (399) specifies a region that intersects a subset of the tiles and a resolution. The subset includes Tile B (312B) and Tile C (312C). However, the subset excludes Tile A (312A) and Tile D (312D).

In response to the scaling request (399), the scaled ED (350) is generated. The scaled ED (350) is generated by rasterizing/rendering the display sub-lists corresponding to the tiles in the subset according to the resolution. In other words, the scaled ED (350) is generated by rasterizing/rendering Display Sub-List B (322A) according to the specified resolution, which includes one or more entries for Graphical Feature Z (306Z), and by rasterizing/rendering Display Sub-List C (322C) accordingly to the specified resolution, which includes one or more entries for Graphical Feature Y (306Y) and fragment i of Graphical Feature X (306X). Accordingly, the scaled ED (350) includes scaled versions of Graphical Feature Z (306Z), Graphical Feature Y (306Y), and fragment i of Graphical Feature X (306X). However, the scaled ED (350) does not have a scaled version of fragment ii of Graphical Feature X (306X), because fragment ii is located within Tile D (312D), which did not intersect with the region specified in the scaling request (399).

Embodiments of the invention may have one or more of the following advantages: the ability to quickly scale EDs; the ability to quickly scale EDs while maintaining high rendered quality; the ability to eliminate extraneous processing when rendering at a given scale and thus not overburden low-powered hardware; the ability to improve the experience of a user viewing and scaling the ED; etc.

Figure 4:
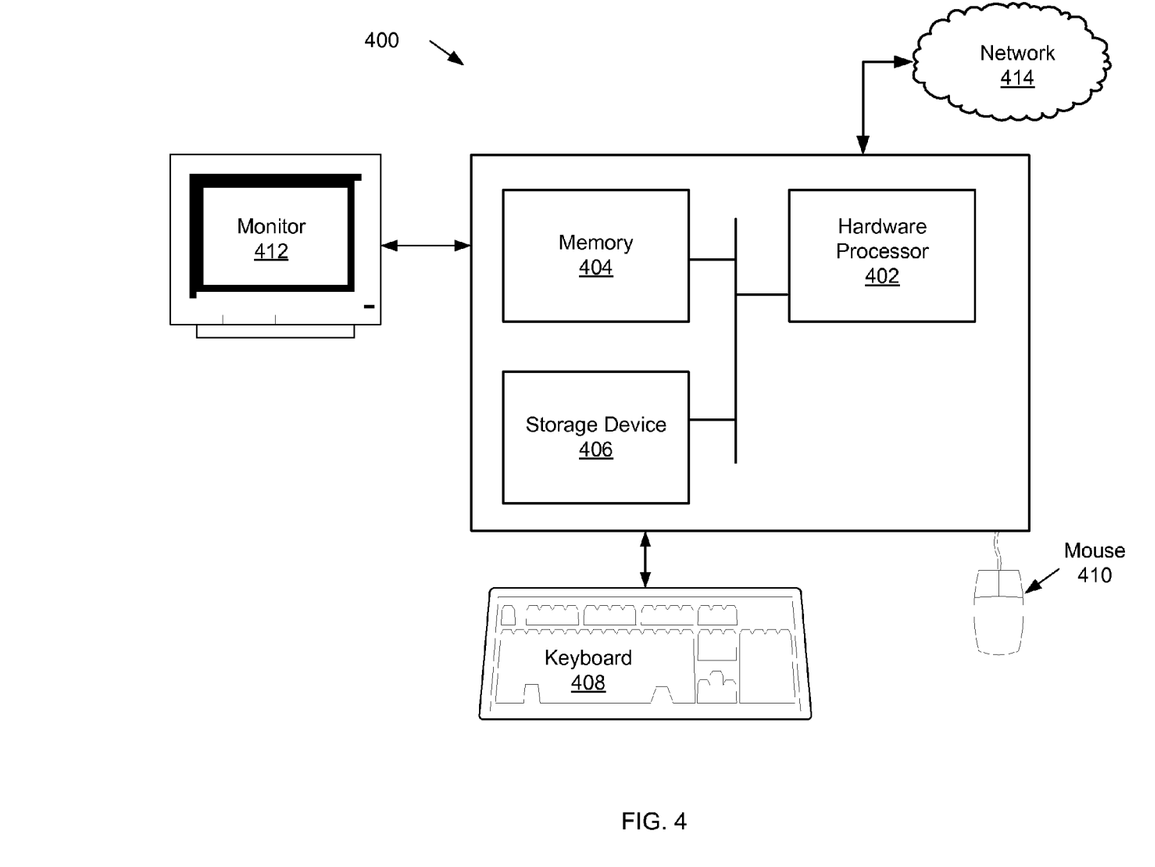
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), an associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. the computing device, the page rendering device, the display device, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scaling on a display device, comprising:
obtaining an electronic document (ED) identifying a first graphical feature and a second graphical feature;
partitioning the ED into a plurality of tiles comprising a first tile and a second tile, wherein the first graphical feature spans the first tile and the second tile, and wherein the second graphical feature is located solely within the second tile;
partitioning the first graphical feature into a first fragment located solely within the first tile and a second fragment located solely within the second tile;
generating a first plurality of elemental vector objects for the first fragment;
adding the first plurality of elemental vector objects to a first display sub-list corresponding to the first tile;
generating a second plurality of elemental vector objects for the second fragment;
adding the second plurality of vector elemental objects and the second graphical feature to a second display sub-list corresponding to the second tile;
receiving a first request to scale the ED, wherein the first request specifies a resolution and a first region intersecting a subset of the plurality of tiles including the first tile but excluding the second tile; and
generating, in response to the first request, a first scaled ED for the display device by rendering the first display sub-list at the resolution without rendering the second display sub-list.

2. The method of claim 1, further comprising:
receiving a second request to scale the ED, wherein the second request specifies a second region intersecting the second tile; and
generating, in response to the second request, a second scaled ED for the display device by rendering the second display sub-list.

3. The method of claim 1, wherein rendering the first display sub-list comprises:
traversing the first display sub-list and scaling the first fragment based on the resolution specified in the first request.

4. The method of claim 1, wherein the ED is described in OOXML.

5. The method of claim 1, wherein the first tile and the second tile have different areas.

6. The method of claim 1, wherein the first display sub-list and the second display sub-list correspond to different sections of a master display list for the ED.

7. The method of claim 1, further comprising:
converting, before receiving the first request to scale the ED, the first fragment and the second fragment into a color space of the display device, wherein the first graphical feature is an image.

8. The method of claim 1, wherein adding the second graphical feature to the second display sub-list comprises:
generating, before receiving the first request to scale the ED, a vector outline for the second graphical feature, wherein the second graphical feature is a text character; and
adding the vector outline to the second display sub-list.

9. A non-transitory computer readable medium (CRM) storing instructions for scaling, the instructions comprising functionality for:
obtaining an electronic document (ED) identifying a first graphical feature and a second graphical feature;
partitioning the ED into a plurality of tiles comprising a first tile and a second tile, wherein the first graphical feature spans the first tile and the second tile, and wherein the second graphical feature is located solely within the second tile;
partitioning the first graphical feature into a first fragment located solely within the first tile and a second fragment located solely within the second tile;
generating a first plurality of elemental vector objects for the first fragment;
adding the first plurality of elemental vector objects to a first display sub-list corresponding to the first tile;
generating a second plurality of elemental vector objects for the second fragment;
adding the second plurality of elemental vector objects and the second graphical feature to a second display sub-list corresponding to the second tile;
receiving a first request to scale the ED, wherein the first request specifies a resolution and a first region intersecting a subset of the tiles including the first tile but excluding the second tile; and
generating, in response to the first request, a first scaled ED for the display device by rendering the first display sub-list at the resolution without rendering the second display sub-list.

10. The non-transitory CRM of claim 9, the instructions further comprising functionality for:
receiving a second request to scale the ED, wherein the second request specifies a second region intersecting the second tile; and
generating, in response to the second request, a second scaled ED for the display device by rendering the second display sub-list.

11. The non-transitory CRM of claim 9, wherein the instructions for rendering the first display sub-list comprise functionality for:
traversing the first display sub-list and scaling the first fragment based on the resolution specified in the first request.

12. The non-transitory CRM of claim 9, wherein the first tile and the second tile have different areas.

13. The non-transitory CRM of claim 9, wherein the first display sub-list and the second display sub-list correspond to different sections of a master display list for the ED.

14. The non-transitory CRM of claim 9, the instructions further comprising functionality for:
converting, before receiving the first request to scale the ED, the first fragment and the second fragment into a color space of the display device, wherein the first graphical feature is an image.

15. The non-transitory CRM of claim 9, wherein adding the second graphical feature to the second display sub-list comprises:
generating, before receiving the first request to scale the ED, a vector outline for the second graphical feature, wherein the second graphical feature is a text character; and
adding the vector outline to the second display sub-list.

16. A system for scaling on a display device, comprising:
a processor;
a buffer storing an electronic document (ED) identifying a first graphical feature and a second graphical feature;

a processing engine executing on the processor and configured to:
- partition the ED into a plurality of tiles comprising a first tile and a second tile;
- partition the first graphical feature into a first fragment located solely within the first tile and a second fragment located solely within the second tile;
- generate a first plurality of elemental vector objects for the first fragment; and
- generate a second plurality of elemental vector objects for the second fragment;

a first sub-display list corresponding to the first tile and comprising the first plurality of elemental vector objects;

a second sub-display list corresponding to the second tile and comprising the second plurality of elemental vector objects; and a rendering engine configured to:
- generate, in response to receiving a first scaling request, a first scaled ED for the display device by rendering the first display sub-list without rendering the second display sub-list,
- wherein the first scaling request specifies a resolution and a region intersecting a subset of the plurality of tiles including the first tile and excluding the second tile.

17. The system of claim 16, wherein the ED is described in OOXML, and wherein the first tile and the second tile have different areas.

18. The system of claim 16, wherein the rendering engine is further configured to:
- generate, in response to receiving a second scaling request specifying a second region intersecting the second tile, a second scaled ED for the display device by rendering the second display sub-list.

19. The system of claim 16, wherein the first sub-display list and the second sub-display list correspond to different sections in a master display list for the ED.

20. The system of claim 16, wherein the processing engine comprises:

an image module configured to:
- convert, before receiving the first scaling request, the first fragment and the second fragment to a color space of the display device, wherein the first graphical feature is an image; and a text module configured to:
- extract a plurality of character data values from a font in the ED;
- generate, before receiving the first scaling request, a vector outline for the second graphical feature in the ED based on the plurality of character data values, wherein the second graphical feature is a text character; and
- add the vector outline to the second display sub-list.

* * * * *